Figure 1:
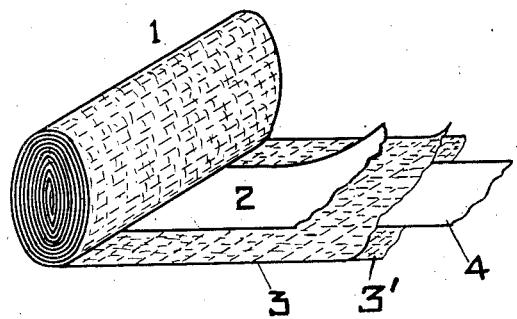

Aug. 21, 1934.     A. SMITH     1,970,776
ELECTROLYTIC CONDENSER
Filed April 20, 1933

INVENTOR
ALBERT SMITH
BY
Edwards, Bower + Pool
ATTORNEYS

Patented Aug. 21, 1934

1,970,776

UNITED STATES PATENT OFFICE 1,970,776

ELECTROLYTIC CONDENSER

Albert Smith, New York, N. Y., assignor to Dubilier Condenser Corporation, New York, N. Y., a corporation of Delaware Application April 20, 1933, Serial No. 666,999

16 Claims. (Cl. 175—315)

This invention relates to a method of and means for impregnating fibrous or absorbent substances with a liquid or mixture or solution of liquids and more particularly to a novel electric condenser such as electrolytics and methods of impregnating them.

Electrolytic condensers as known in the art generally comprise a pair of electrodes, such as strips of aluminum foil separated from each other by means of a strip of porous or absorbent material such as paper, cloth, gauze and the like. At least one of the electrodes is coated with a dielectric film preferably by means of an electrochemical method and the absorbent separator sheet is impregnated with an electrically conducting solution such as an electrolytic solution of same or similar nature as used for forming the insulating dielectric film. This solution absorbed in the separating sheet serves as a conductor for the electric current to the non-filmed electrode of the condenser.

The electrolytic solution held within the porous or absorbent separator between the electrodes being a conductor of the electric current has heretofore entailed considerable electric losses in the form of heat, resulting in a lower power factor and decreased efficiency of the condenser. These losses are greater when there is insufficient impregnation of the condenser.

Accordingly, it is one object of the invention to provide a novel electrolytic condenser and a new means and method for impregnating electrolytic condensers of the type as described in particular and for impregnating any kind of absorbent substance in general, insuring a thorough impregnation and consequent increased effectiveness of the impregnating solution.

A further object of my invention is to provide a novel method of impregnating electrolytic condensers in a vacuum.

According to the invention, the impregnation is carried out under a vacuum or partial vacuum in that the assembled condenser or other absorbent body after having been wound into a roll preferably held together, such as by means of a rubber band, is placed in a vessel or impregnating tank filled with impregnation solution. The impregnation solution is then maintained at boiling point temperature while the tank is exhausted by means of a pump capable of producing a vacuum in the impregnating tank. The evacuation is continued until substantially all air is removed from the condenser and the fibrous separator between the electrodes is thoroughly impregnated with the electrolytic solution.

The electrolytic mixtures or solutions generally used for manufacturing electrolytic condensers usually consist of a highly evaporable aqueous substance, such as ammonia water in glycerine. Prolonged ebullition of the electrolyte maintained at boiling temperature in the tank in which the condensers or condenser sections are impregnated, causes some or all of the water content or similar neutral thinning fluid in the solution or of free water released during the chemical process, to evaporate so that the electrolyte becomes thick and more viscous. The electrolyte must then be restored to its proper degree of viscosity without impairing its properties by the addition thereto from time to time of an appropriate quantity of neutral thinning liquid such as water.

Accordingly, a further object of my invention is to provide a novel method for preventing substantial change in the viscosity of the electrolyte during the vacuum impregnation.

A further object of the invention consists in the provision of novel means for lowering the vapor pressure or raising the boiling point of the electrolyte solution used for impregnation of the condenser by the addition of a further liquid substance of higher boiling point than the boiling point of the electrolyte solution and having a lower specific gravity and accordingly floating on top and covering the impregnating solution.

When impregnating a condenser under a vacuum or a partial vacuum, the boiling point of the impregnating solution will be reduced or the vapor pressure increased as is well known as all liquids have lower boiling points at lower air pressure. This is due to the greater freedom that molecules of the liquid encounter when moving outward from the surface of the liquid into the rarified air. In other words, the vapor density increases with decreasing pressure. Thus in producing a vacuum in an impregnating tank as described, containing electrolytic solution for impregnation of electrolytic condensers, the result will be a considerably increased evaporation of the water or other neutral thinning liquid requiring a more frequent replenishing of the water content and continuous supervision of the impregnating process. By using the new means and method according to the invention contemplating the addition of a second liquid substance of higher boiling point and lower specific gravity poured on top and covering the impregnating electrolyte proper for the purpose of artificially lowering the vapor pressure of the impregnating solution under reduced air pressure or partial vacuum, the condenser may be easily and readily impregnated under a vacuum without the above-mentioned attendant disadvantages. In this manner a very thorough and efficient impregnation of the electrolytic condenser is insured in an economical manner without increasing the production costs or impairing the electrical characteristics of the condenser.

Accordingly it is a further object of the invention to provide a novel means and methods for impregnating electrolytic condensers under vacuum in an efficient and economical manner compared with the ordinary impregnation under atmospheric pressure known in the art.

These and further objects and aspects of the invention will appear in more detail from the following description taken in reference with the accompanying drawing.

It is understood that the invention may be applied to various other purposes such as generally for impregnating absorbent substances other than the impregnation of electrolytic condensers whereby the same result of a more thorough and efficient impregnation is obtained in accordance with its broader scope and spirit, as expressed by the scope of the appended claims.

Figure 1 of the drawing, illustrates by way of example, a condenser of the wound type which may be impregnated according to the method of the invention.

Figure 2:
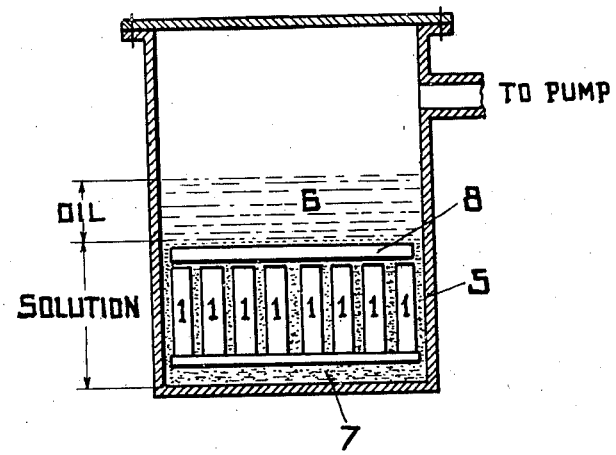

Figure 2 schematically shows the impregnating tank and the impregnating solutions and condensers placed therein for impregnation under vacuum in accordance with the novel method of the invention.

Referring more particularly to Figure 1, this illustrates a partly finished electrolytic condenser 1 of the wound type as known in the art comprising essentially two metallic sheets or strips 2 and 4, preferably consisting of aluminum with absorbent separator sheets 3 and 3', such as of cloth, gauze, paper, and the like or a combination thereof placed therebetween and wound into a roll. Either one or both of the sheets 2 and 4 may be coated with an insulating or oxide film in accordance with known methods in the art. After the condenser has been assembled in this manner, it is held together by suitable means such as a rubber band, and the thus obtained condenser units 1 are then placed in the impregnating tank 5 as shown by Figure 2. It is understood that the forming of the insulating film in either one or both of the electrodes 2 and 4 may be carried out simultaneously during the impregnating process, dependent on the particular method of processing employed outside the scope of the present invention.

The tank 5 is filled with the electrolytic solution 7 sufficiently covering the condenser units. There is furthermore shown an aluminum frame 8 or other member for weighting down the condenser units so that they will be beneath the surface of the impregnating solution. Then a layer of molten paraffin oil or other substance 6 having a relatively high boiling point or correspondingly low vapor pressure at reduced air pressure is poured on the impregnating solution. Substances other than molten paraffin oil may be used so long as they, in accordance with the essential underlying principle of the invention, do not react nor otherwise interfere chemically nor physically such as by diffusion with the impregnating solution and furthermore have a lower specific gravity than the solution so as to float upon and cover the impregnating solution proper.

In this manner, molecules moving upward from the surface of the electrolytic solution when hitting molecules of paraffin will rebound and be forced back to the electrolytic solution and accordingly the vapor density of the solution above the partition of the solution and paraffin will be lowered accordingly, resulting in a decreased vapor pressure of the electrolytic solution. Thus, the presence of the substance 6 makes it more difficult for molecules of the impregnating solution 7 to escape into the rarified air space above the substance 6 which is equivalent to a decreased vapor pressure and consequent increase of the boiling point, thus making it possible to impregnate the condenser in the solution under partial vacuum in the same manner as with an ordinary impregnation under atmospheric pressure without excessive loss of water or other neutral thinning liquid from the solution.

The invention will be further understood from the following example. The boiling point of electrolytic condenser solution in a practical case may, for instance, be about 268° F. at atmospheric pressure (equal to 760 millimeters of mercury) whereas at the pressure of 40 millimeters mercury, it will boil at 150° F. Solution with a layer of paraffin or oil on it will also boil at a lower temperature with decreasing air pressure.

Under a given air pressure, a solution with a layer of oil on it will boil at a higher temperature than the solution without the oil, as described in detail, and the difference in boiling points between the two solutions will increase with decrease in air pressure, or in other words, the boiling point of the solution with the oil will go down faster with lower air pressure than will that of a solution without oil. In the example given, the solution without oil would boil at 268° F. and at 150° F. at pressures of 760 and 40 millimeters respectively, and the same solution with the oil on it will boil at about 270° F. and 230° F. at the same pressures of 760 and 40 millimeters respectively. By thus decreasing the difference between boiling points at definite different pressures, excessive evaporation and loss of water or other neutral thinning liquid of the solution may be substantially avoided.

The oil or other substance placed on the impregnating solution furthermore acts like a filter by readily allowing the passage of air removed from the condenser in the form of bubbles but substantially preventing the passing through of particles of the impregnating solution, thus allowing on the one hand a thorough impregnation under a vacuum and preventing, on the other hand, excessive loss of impregnating liquid.

In practice it was found that a layer of molten paraffin of about 4 to 5" thickness poured on the electrolytic solution gives satisfactory result. The temperature of the solution and of the paraffin is maintained at about 180 to 190° F. when using an electrolyte of the generally known kind comprising an aqueous solution such as of glycerine and ammonium borate. Under these conditions of temperature and the presence of paraffin layer, the solution boils at a pressure about 20 millimeters of mercury. I have found it advisable to maintain the pressure at about 22 millimeters of mercury for 20 to 30 minutes and then restore the normal atmospheric pre sure for about 5 minutes; this process being repeated once or several times as required by the special circumstances. The contents of the tanks are then allowed to cool to about 150° F. and the condenser sections removed from the paraffin. This time will in general be sufficient to thoroughly and efficiently impregnate a standard gauze wound electrolytic condenser designed for 8 mfd. and 500 volts.

It will be understood that the above theory, given for the more thoroughly impregnated condenser, may be otherwise explained than that proposed above. The impregnated electrolyte, it has been found, penetrates into every pore of the paper and produces a better and more efficient condenser than has heretofore been produced.

I claim:

1. In the art of impregnating absorbent substances with a solution containing a highly evaporable thinning liquid maintained at boiling temperature during the impregnation process, the steps of wholly immersing the absorbent substances in said liquid and of artificially decreasing the vapor pressure of said solution to prevent excessive evaporation of said thinning liquid while the absorbent substances remain wholly immersed.

2. In the art of impregnating absorbent substances in a solution containing a highly evaporable thinning liquid and maintained at boiling temperature during the impregnating process, the steps of wholly immersing the absorbent substances in said liquid and of artificially decreasing the vapor pressure of said solution consisting of adding thereto a liquid chemically and physically non-interfering substance having lower vapor pressure and lower specific gravity than the impregnating solution while the absorbent substances remain wholly immersed.

3. In the art of impregnating absorbent substances with a solution containing a highly evaporable thinning liquid maintained at boiling temperature under vacuum during the impregnating process, the steps of wholly immersing the absorbent substances in said liquid and of artificially decreasing the vapor pressure of said solution consisting of adding thereto a physically and chemically non-interfering liquid substance and having a lower vapor pressure and lower specific gravity than the impregnating solution proper while the absorbent substances remain wholly immersed.

4. In the art of manufacturing electrolytic condensers comprising an absorbent substance between the condenser electrodes impregnated with an electrolyte solution, the method of impregnation under boiling temperature of the impregnating electrolyte comprising wholly immersing the condensers in the electrolyte and artificially decreasing the vapor pressure of the electrolyte solution by adding thereto a chemically and physically non-interfering liquid substance of lower vapor pressure and specific gravity than the impregnating solution, the condensers remaining wholly immersed while the method is carried out.

5. In the art of impregnating absorbent substances with an aqueous solution at boiling point temperature under vacuum, the steps of wholly immersing the absorbent substances in said aqueous solution of decreasing the vapor pressure of the impregnating solution consisting of adding thereto a chemically and physically non-interfering liquid substance having a vapor pressure and specific gravity less than the impregnating solution while the absorbent substances remain wholly immersed.

6. In the art of manufacturing electrolytic condensers comprising absorbent separators between the condenser electrodes impregnated with an electrolyte solution, the method of impregnation comprising wholly immersing the condensers in the solution under boiling temperature of the electrolyte solution and under vacuum consisting of decreasing the vapor pressure of the impregnating solution by adding thereto a chemically and physically non-interfering liquid substance having a lower vapor pressure and specific gravity than the impregnating solution and acting as a filter for the air removed from the condenser, the method being continuously carried out until the impregnation of the separators has been completed.

7. In the art of manufacturing electrolytic condensers comprising absorbent separators between the condenser electrodes impregnated with an aqueous electrolyte solution, the method of impregnation comprising wholly immersing the condensers in the solution under boiling temperature of the impregnating solution and under partial vacuum consisting of decreasing the vapor pressure of the impregnating solution by adding thereto an oily substance having a lower vapor pressure than the impregnating solution, the method being continuously carried out from the beginning of impregnation until the impregnation of the separators has been completed.

8. In the art of manufacturing electrolytic condensers comprising absorbent separators between the condenser electrodes impregnated with an aqueous electrolyte solution, the method of impregnation comprising wholly immersing the condensers in the solution under boiling temperature of the impregnating solution and under partial vacuum consisting of decreasing the vapor pressure of the impregnating solution by adding thereto molten paraffin having a lower vapor pressure and specific gravity than the impregnating solution, the method being continuously carried out from the beginning of impregnation until the impregnation of the separators has been completed.

9. The method of manufacturing electrolytic condensers comprising absorbent separators between the condenser electrodes impregnated with an electrolyte solution consisting of placing a plurality of the assembled condenser units in a tank containing impregnating solution, surrounding and completely covering said condenser units, maintaining said solution at boiling point temperatures during the entire impregnation process, adding a further chemically and physically non-interfering liquid substance of lower vapor pressure and specific gravity than the impregnating solution to float upon and covering the impregnating solution and producing a partial vacuum during the impregnating period.

10. The method of manufacturing electrolytic condensers comprising absorbent separators between the condenser electrodes impregnated with an aqueous electrolyte solution consisting of placing a plurality of the assembled condenser units in a tank containing impregnating solution, surrounding and completely covering the condenser units at all sides maintaining the solution at boiling temperature during impregnation, adding further oily substance having a lower vapor pressure and specific gravity than the impregnating electrolyte to float upon and completely cover the electrolyte and maintaining a partial vacuum in said tank during the impregnating process, the method being continuously carried out until the impregnation of the separators has been completed.

11. The method of manufacturing electrolytic condensers which comprises wholly immersing the condenser in an electrolyte, impregnating the condenser with said electrolyte under vacuum and artificially changing the vapor density of the electrolyte to prevent the escape of water.

12. The method of manufacturing electrolytic condensers which comprises wholly immersing the condenser in an electrolyte, impregnating the condenser with said electrolyte under a partial vacuum and artificially raising the boiling temperature of the electrolyte.

13. The method of manufacturing electrolytic condensers comprising the steps of assembling the metallic sheets with absorbent separating material, placing a plurality of assembled condenser units in a vacuum chamber containing an electrolytic solution with an overlying layer or film of oily substance, applying heat to said tank, and gradually exhausting the air therefrom until a substantial vacuum is obtained.

14. The method of manufacturing electrolytic condensers comprising the steps of assembling the metallic sheets with absorbent separating material, placing a plurality of assembled condenser units in a vacuum chamber containing an electrolytic solution with an overlying layer or film of oily substance, applying heat to said tank and gradually exhausting the air therefrom until a substantial vacuum is obtained, then reducing the heat and removing the condenser units.

15. The method of manufacturing electrolytic condensers comprising the steps of assembling the metallic sheets with absorbent separating material, placing a plurality of assembled condenser units in a vacuum chamber partly filled with an electrolytic solution having an overlying layer or film of oily substance and less specific gravity than the solution, maintaining the plurality of assembled condenser units wholly immersed in the solution, applying heat to the tank and gradually exhausting the air therefrom until a substantial vacuum is obtained while maintaining the heat until the condenser units are fully impregnated.

16. The method of manufacturing electrolytic condensers comprising the steps of assembling the metallic sheets with absorbent separating material, placing a plurality of assembled condenser units in a vacuum chamber partly filled with an electrolytic solution having an overlying layer or film of oily substance of less specific gravity than the solution, maintaining the plurality of assembled condenser units wholly immersed in the solution, applying heat to the tank and gradually exhausting the air therefrom until a substantial vacuum is obtained while maintaining the heat until the condenser units are fully impregnated, thereafter reducing the heat and removing the impregnated condenser units.

ALBERT SMITH.